(12) United States Patent
Balsdon

(10) Patent No.: US 11,030,374 B1
(45) Date of Patent: *Jun. 8, 2021

(54) FILLING VACANT AREAS OF AN INTEGRATED CIRCUIT DESIGN

(71) Applicant: Pulsic Limited, Bristol (GB)

(72) Inventor: Graham Balsdon, Glos (GB)

(73) Assignee: Pulsic Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,997

(22) Filed: Jun. 23, 2020

Related U.S. Application Data

(60) Continuation of application No. 15/709,376, filed on Sep. 19, 2017, now Pat. No. 10,691,858, which is a division of application No. 13/909,872, filed on Jun. 4, 2013, now Pat. No. 9,767,242, which is a division of application No. 12/727,227, filed on Mar. 18, 2010, now Pat. No. 8,458,636.

(60) Provisional application No. 61/161,308, filed on Mar. 18, 2009.

(51) Int. Cl.
| | |
|---|---|
| *G06F 30/30* | (2020.01) |
| *G06F 30/392* | (2020.01) |
| *G06F 30/39* | (2020.01) |
| *G06F 119/18* | (2020.01) |

(52) U.S. Cl.
CPC ............ *G06F 30/392* (2020.01); *G06F 30/39* (2020.01); *G06F 2119/18* (2020.01); *Y02P 90/02* (2015.11)

(58) Field of Classification Search
CPC .... G06F 30/392; G06F 30/39; G06F 2119/18; Y02P 90/02

USPC ........................................................ 716/118
See application file for complete search history.

(56) References Cited

U.S. PATENT DOCUMENTS

| | | | |
|---|---|---|---|
| 4,615,011 | A | 9/1986 | Linsker |
| 4,673,966 | A | 6/1987 | Shimoyama |
| 4,777,605 | A | 10/1988 | Fournier |
| 4,782,193 | A | 11/1988 | Linsker |
| 4,811,237 | A | 3/1989 | Putatunda et al. |
| 4,815,003 | A | 3/1989 | Putatunda et al. |
| 4,852,015 | A | 7/1989 | Doyle, Jr. |
| 4,855,253 | A | 8/1989 | Weber |
| 4,965,739 | A | 10/1990 | Ng et al. |
| 5,062,054 | A | 10/1991 | Kawakami et al. |
| 5,072,402 | A | 12/1991 | Ashtaputre et al. |
| 5,272,645 | A | 12/1993 | Kawakami et al. |
| 5,353,235 | A | 10/1994 | Do et al. |
| 5,375,069 | A | 12/1994 | Satoh et al. |
| 5,500,804 | A | 3/1996 | Honsinger et al. |
| 5,541,005 | A | 7/1996 | Bezama et al. |
| 5,550,748 | A | 8/1996 | Xiong |
| 5,635,736 | A | 6/1997 | Funaki et al. |
| 5,637,920 | A | 6/1997 | Loo |
| 5,640,327 | A | 6/1997 | Ting |
| 5,646,830 | A | 7/1997 | Nagano |
| 5,650,653 | A | 7/1997 | Rostoker et al. |
| 5,689,433 | A | 11/1997 | Edwards |

(Continued)

OTHER PUBLICATIONS

Finch, A.G. et al., "A Method for Gridless Routing of Printed Circuit Boards", IEEE, Paper 32.2, 1985, pp. 509-515.

*Primary Examiner* — Jack Chiang
*Assistant Examiner* — Brandon Bowers
(74) *Attorney, Agent, or Firm* — Aka Chan LLP

(57) ABSTRACT

Vacant areas of a layer of an integrated circuit design are filled with shapes connected to the appropriate nets.

16 Claims, 6 Drawing Sheets

(56) References Cited

U.S. PATENT DOCUMENTS

| | | | |
|---|---|---|---|
| 5,723,908 A | 3/1998 | Fuchida et al. | |
| 5,757,089 A | 5/1998 | Ishizuka | |
| 5,784,289 A | 7/1998 | Wang | |
| 5,790,414 A | 8/1998 | Okano et al. | |
| 5,801,385 A | 9/1998 | Endo et al. | |
| 5,801,959 A | 9/1998 | Ding et al. | |
| 5,811,863 A | 9/1998 | Rostoker et al. | |
| 5,822,214 A | 10/1998 | Rostoker et al. | |
| 5,880,969 A | 3/1999 | Hama et al. | |
| 5,889,329 A | 3/1999 | Rostoker et al. | |
| 5,980,093 A | 11/1999 | Jones et al. | |
| 6,111,756 A | 8/2000 | Moresco | |
| 6,150,193 A | 11/2000 | Glenn | |
| 6,066,440 A | 12/2000 | Yang | |
| 6,219,823 B1 | 4/2001 | Hama et al. | |
| 6,260,183 B1 | 7/2001 | Raspopovic et al. | |
| 6,262,487 B1 | 7/2001 | Igarashi et al. | |
| 6,263,475 B1 | 7/2001 | Toyonaga et al. | |
| 6,282,693 B1 | 8/2001 | Naylor et al. | |
| 6,301,686 B1 | 10/2001 | Kikuchi et al. | |
| 6,301,693 B1 | 10/2001 | Naylor et al. | |
| 6,307,256 B1 | 10/2001 | Chiang et al. | |
| 6,316,838 B1 | 11/2001 | Ozawa et al. | |
| 6,323,097 B1 | 11/2001 | Wu et al. | |
| 6,324,674 B2 | 11/2001 | Andreev et al. | |
| 6,324,675 B1 | 11/2001 | Dutta et al. | |
| 6,349,403 B1 | 2/2002 | Dutta et al. | |
| 6,408,427 B1 | 6/2002 | Cong et al. | |
| 6,412,097 B1 | 6/2002 | Kikuchi et al. | |
| 6,448,591 B1 | 9/2002 | Juengling | |
| 6,480,993 B1 | 11/2002 | Suto et al. | |
| 6,480,996 B1 | 11/2002 | Aji et al. | |
| 6,499,135 B1 * | 12/2002 | Li | G06F 30/39 716/122 |
| 6,507,941 B1 | 1/2003 | Leung et al. | |
| 6,510,545 B1 | 1/2003 | Yee et al. | |
| 6,516,455 B1 | 2/2003 | Teig et al. | |
| 6,526,555 B1 | 2/2003 | Teig et al. | |
| 6,543,043 B1 | 4/2003 | Wang et al. | |
| 6,553,338 B1 | 4/2003 | Buch et al. | |
| 6,564,366 B1 | 5/2003 | Marchenko et al. | |
| 6,598,215 B2 | 7/2003 | Das et al. | |
| 6,645,842 B2 | 11/2003 | Igarashi et al. | |
| 6,662,348 B1 | 12/2003 | Naylor et al. | |
| 6,671,859 B1 | 12/2003 | Naylor et al. | |
| 6,711,727 B1 | 3/2004 | Teig et al. | |
| 6,734,472 B2 | 5/2004 | Ho | |
| 6,895,567 B1 | 5/2005 | Teig et al. | |
| 6,931,610 B1 | 8/2005 | Buch et al. | |
| 7,065,729 B1 | 6/2006 | Chapman | |
| 7,100,135 B2 | 8/2006 | Meyer et al. | |
| 7,152,215 B2 * | 12/2006 | Smith | H01L 21/7684 716/52 |
| 7,240,314 B1 * | 7/2007 | Leung | G06F 30/39 257/773 |
| 7,340,708 B2 | 3/2008 | Hamazaki | |
| 7,565,638 B2 * | 7/2009 | Hoerold | G06F 30/398 716/106 |
| 2001/0004763 A1 | 6/2001 | Kato | |
| 2001/0009031 A1 | 7/2001 | Nitta et al. | |
| 2002/0069397 A1 | 6/2002 | Teig et al. | |
| 2003/0025205 A1 | 2/2003 | Shively | |
| 2005/0240893 A1 | 10/2005 | Teig et al. | |
| 2006/0095872 A1 | 5/2006 | McElvain et al. | |

\* cited by examiner

Figure 6A
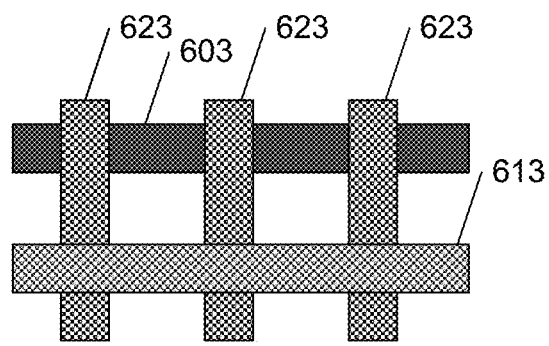
All fillers redundant
Figure 6B
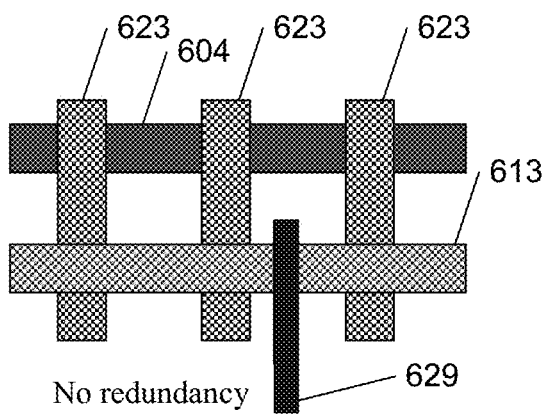
No redundancy
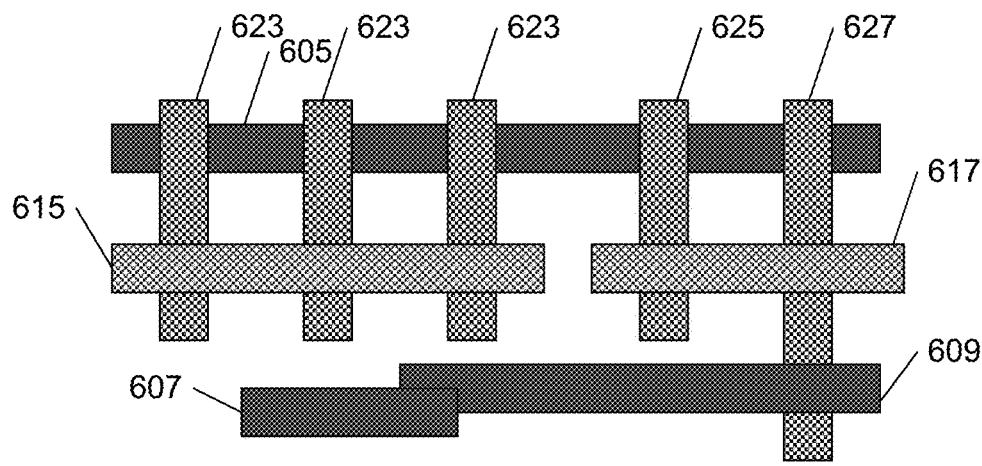
4 fillers on left redundant ; others are not
Figure 6C

FILLING VACANT AREAS OF AN INTEGRATED CIRCUIT DESIGN

CROSS-REFERENCE TO RELATED APPLICATIONS

This patent application is a continuation of U.S. patent application Ser. No. 15/709,376, filed Sep. 19, 2017, issued as U.S. Pat. No. 10,691,858 on Jun. 23, 2020, which is a divisional of U.S. patent application Ser. No. 13/909,872, filed Jun. 4, 2013, issued as U.S. Pat. No. 9,767,242 on Sep. 19, 2017, which is a divisional of U.S. patent application Ser. No. 12/727,227, filed Mar. 18, 2010, issued as U.S. Pat. No. 8,458,636 on Jun. 4, 2013, which claims the benefit of U.S. patent application 61/161,308, filed Mar. 18, 2009. These patents are incorporated by reference along with all other references cited in this application.

BACKGROUND OF THE INVENTION

The present invention relates to the field of electronic design automation for integrated circuit, and in particular, to filling vacant areas of a routed design with metal attached to power or ground.

Integrated circuits are important building blocks of the information age and are critical to the information age, affecting every industry including financial, banking, legal, military, high technology, transportation, telephony, oil, medical, drug, food, agriculture, education, and many others. Integrated circuits such as DSPs, amplifiers, DRAMs, SRAMs, EPROMs, EEPROMs, Flash memories, microprocessors, ASICs, and programmable logic are used in many applications such as computers, networking, telecommunications, and consumer electronics.

Consumers continue to demand greater performance in their electronic products. For example, higher speed computers will provide higher speed graphics for multimedia applications or development. Higher speed internet web servers will lead to greater on-line commerce including on-line stock trading, book sales, auctions, and grocery shopping, just to name a few examples. Higher performance integrated circuits will improve the performance of the products in which they are incorporated.

Large modern day integrated circuits have millions of devices including gates and transistors and are very complex. As process technology improves, more and more devices may be fabricated on a single integrated circuit, so integrated circuits will continue to become even more complex with time. To meet the challenges of building more complex and higher performance integrated circuits, software tools are used. These tools are in an area commonly referred to as computer aided design (CAD), computer aided engineering (CAE), or electronic design automation (EDA). There is a constant need to improve these electronic automatic tools in order to address the desire to for higher integration and better performance in integrated circuits.

An integrated circuit may be specified using a netlist and a layout. The netlist provides information about devices or components of the integrated circuit and their connectivity. The integrated circuit layout or integrated circuit mask layout is the representation of an integrated circuit in terms of planar geometric shapes, patterns, and features that correspond to shapes used in a mask to fabricate the circuit. A design engineer or mask designer may create the layout of the integrated circuit. Some features in the layout or certain masks may be automatically generated, such as automatically routed.

In a typical layout, there are a very large number of shapes, patterns, and features. It may be desirable (or required) to fill vacant areas of a routed design with metal (or any other material) attached to power and ground (or other desirable connection). This process is often carried out by layout engineers manually drawing shapes in unused areas, while trying to conform to the layout design (or DRC) rules. As can be appreciated, this manual process is very time consuming Therefore, there is a need for improved technique for filling vacant areas of integrated circuit design, especially where these vacant areas are filled with metal or another conductor connected to a supply line such as power or ground.

BRIEF SUMMARY OF THE INVENTION

Vacant areas of a layer of an integrated circuit design are filled with shapes connected to the appropriate nets. The layer may be a metal or other conductor layer. The generated shapes can be connected to power or ground.

In an implementation, a method includes: for a first layer of an integrated circuit design, using a computer, creating a first rectangle to cover a region of the integrated circuit design; determine where the first rectangle overlaps a previously drawn second rectangle on the first layer; oversize the second rectangle to obtain a third rectangle; subtract the third rectangle from the first rectangle to form a fourth rectangle, fifth rectangle, and sixth rectangle, where the fourth, fifth, and sixth rectangles each have a smaller in area than the first rectangle and the fourth, fifth, and sixth rectangles overlap; if the sixth rectangle has a smaller width than a first minimum width, discard the third rectangle while keeping the fourth and fifth rectangles; starting with an edge of the forth rectangle, growing an island that extends from the edge to a limit line at a second minimum width; discarding portions of the fourth and fifth rectangles beyond the limit line to obtain a first shape including rectangles; and finding a second shape on a second layer, different form the first layer, that overlaps the first shape.

The method includes creating a via shape on a third layer, different from the first and second layers, that overlaps both the first and second shapes. The method includes: finding a third shape on the second layer overlaps the first shape, where the second shape is connected to a first power net and the third shape is connected to a second power net, different from the first power net; permitting specifying of a first target percentage for the first power net and a second target percentage for the second power net; determining a third percentage of shapes added the free space of the first layer that are connected to the first power net and a fourth percentage of shapes added the free space of the first layer that are connected to the second power net; when the third percentage is less than the first target percentage by more than the fourth percentage is less than the second target percentage, adding a via shape to a third layer that overlaps the first and second shapes; and when the fourth percentage is less than the second target percentage by more than the third percentage is less than the first target percentage, adding a via shape to the third layer that overlaps the first and third shapes.

The method includes discarding a rectangle of the first shape that has a width less than a third minimum width. The method includes removing a portion of a rectangle of the first shape that has a greater than a first maximum distance beyond a via shape connecting the first and second shapes. The second shape can be automatically generated by the computer on the second layer. The method includes forming a connecting of the second shape to the first shape using a via shape; determining whether the second shape is has a further connecting to a third shape on a third layer, different from the first and second shapes; and if the second shape does not have a further connecting to a third shape, discarding the second shape and the via shape.

The method includes: forming a connecting of the second shape to the first shape using a via shape; determining whether the second shape is has a further connecting to a third shape on the second third layer; and if the second shape does not have a further connecting to a third shape, discarding the second shape and the via shape. The method includes: finding a third shape on a first layer that is identified as a power net; and adding a seventh rectangle to connect the first and third shapes directly together.

In another implementation, a method includes: using a computer, automatically creating a first shape including rectangles that is representative of free space on a first layer of an integrated circuit design; automatically creating a second shape including rectangles that is representative of free space on a second layer of the integrated circuit design, where the second layer is different from the first layer; and automatically creating a first via shape in a third layer, different from the first and second layers, that overlaps both the first and second shapes.

The method includes: determining whether the first shape is further connected to a third shape on a fourth layer, different from the first and second layers; and if the first shape does not have a further connecting to a third shape, discarding the first shape and the first via shape. The method includes: determining whether the first shape is further connected to a third shape on the second layer; and if the first shape does not have a further connecting to a third shape, discarding the first shape and the via shape.

A distance from a leftmost edge the first shape to a rightmost edge of the first shape may not exceed a maximum width specified for the automatic creation. The method includes: when the first and second shapes do not overlap, finding a third shape on the second layer that was not automatically generated; automatically creating a second via shape in the third layer that overlaps both the first and third shapes. The method includes upon request by a user, showing only the automatically generated shapes of the first layer on a display of the computer.

In another implementation, a method includes: using a computer, automatically creating a first shape including rectangles that is representative of free space on a first layer of an integrated circuit design; finding a second shape and a third shape a second layer of the integrated circuit design that both overlap the first shape, where the second layer is different from the first layer; determining the second shape is connected to first power net and the third shape is connected to a second power net, different from the first power net; making a determination whether to connect the first shape to the second shape or the third shape based on target percentages specified for the first and second power nets; if the determination is made to connect the first shape to the second shape, automatically creating a first via shape in a third layer, different from the first and second layers, that overlaps both the first and second shapes; and if the determination is made to connect the first shape to the third shape, automatically creating a second via shape in the third layer that overlaps both the first and third shapes.

The making a determination whether to connect the first shape to the second shape or the third shape based on target percentages specified for the first and second power nets can include: determining a first percentage utilization of the first power net in the free space and a second percentage utilization of the second power net in the free space; and determining whether the first percentage utilization is less than a target percentage for the first power net and the second percentage utilization is less than a target percentage for the second power net.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 6A-6C show results of a delete hanging technique.

DETAILED DESCRIPTION OF THE INVENTION

Figure 1:
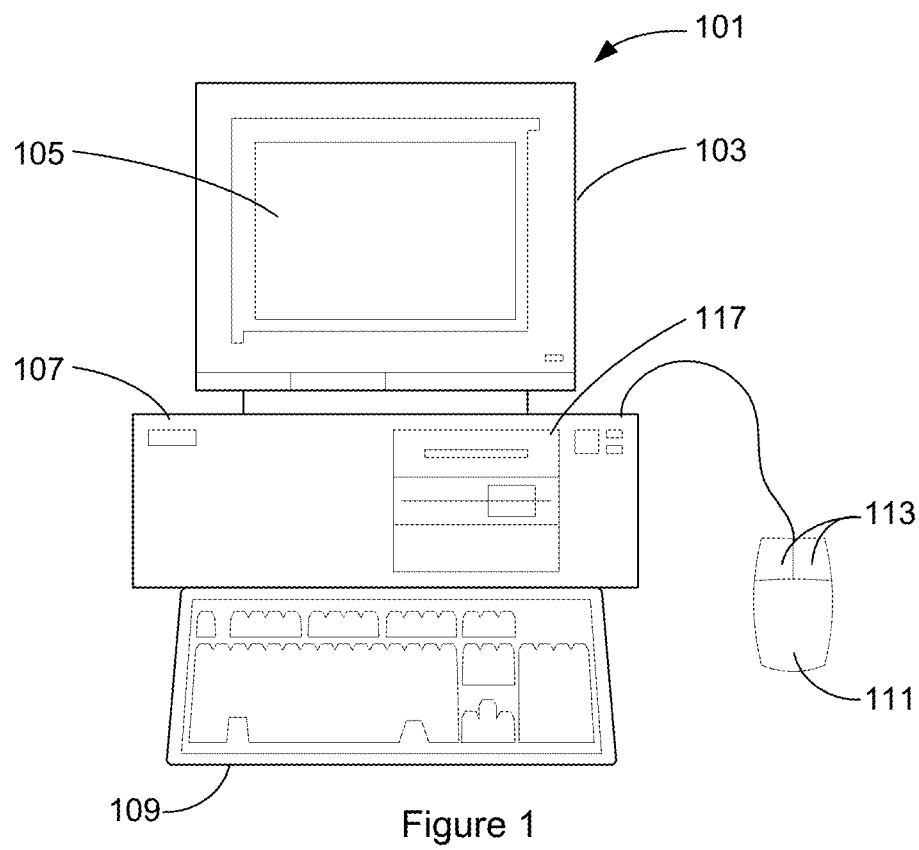
FIG. 1 shows a system of the present invention for performing electronic circuit design, including automatic routing of nets and compaction of space of an integrated circuit.

FIG. 1 shows an electronic design automation (EDA) system of the present invention for designing an electronic circuit or integrated circuit, including automatic routing of nets and compaction of space of the circuit. In an embodiment, the invention is software that executes on a computer workstation system, such as shown in FIG. 1. FIG. 1 shows a computer system 101 that includes a monitor 103, screen 105, enclosure 107, keyboard 109, and mouse 111. Mouse 111 may have one or more buttons such as mouse buttons 113. Enclosure 107 (may also be referred to as a system unit, cabinet, or case) houses familiar computer components, some of which are not shown, such as a processor, memory, mass storage devices 117, and the like.

Mass storage devices 117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 117. The source code of the software of the present invention may also be stored or reside on mass storage device 117 (e.g., hard disk, magnetic disk, tape, or CD-ROM). As a further example, code of the invention may be transmitted via wires, radio waves, or through a network such as the Internet.

Figure 2:
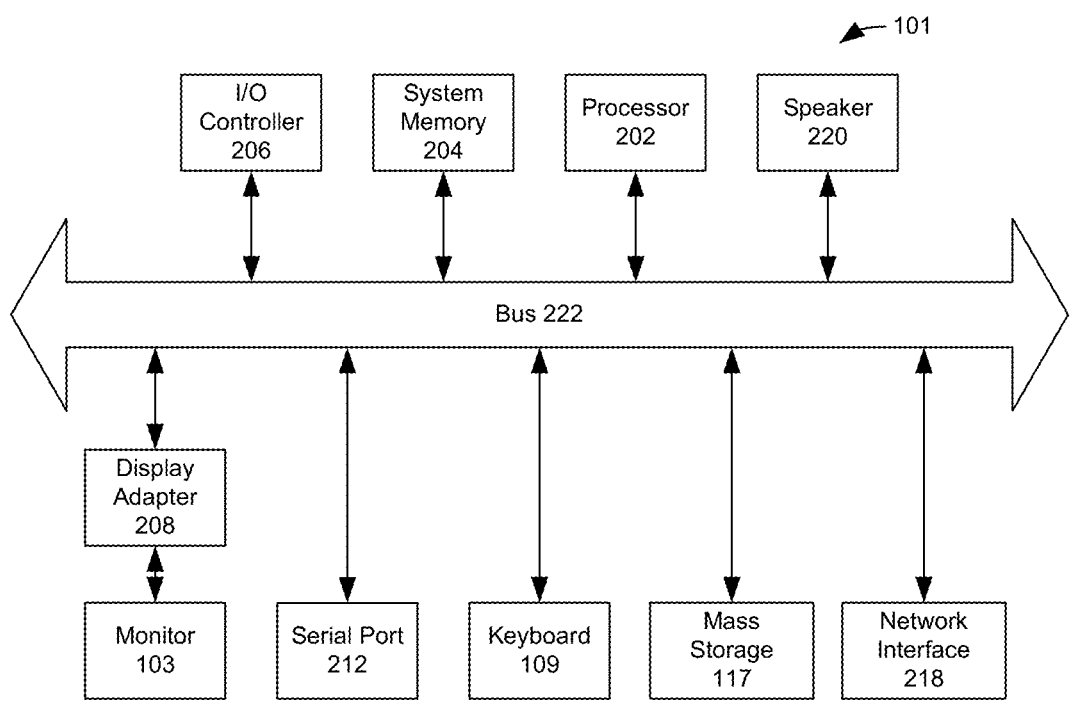
FIG. 2 shows a simplified system block diagram of computer system used in implementation of the present invention.

FIG. 2 shows a system block diagram of computer system 101 used to execute software of the present invention. As in FIG. 1, computer system 101 includes monitor 103, keyboard 109, and mass storage devices 117. Computer system 101 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 101. However, these arrows are illustrative of any interconnection scheme serving to link the subsystems. For example, speaker 220 could be connected to the other subsystems through a port or have an internal connection to central processor 202. Computer system 101 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
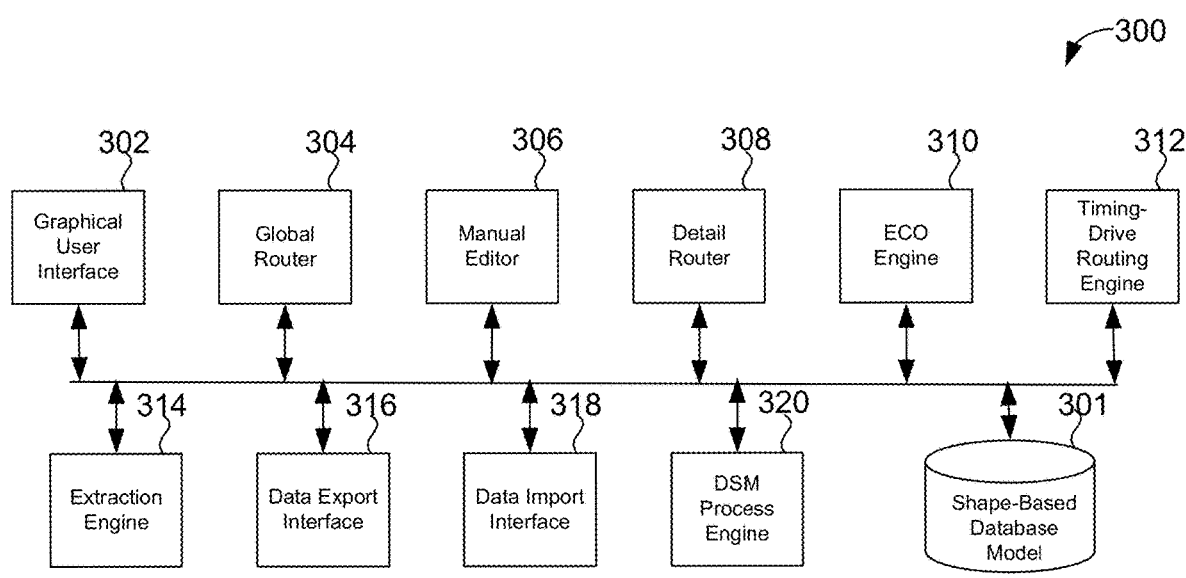
FIG. 3 shows a simplified functional block diagram of an exemplary EDA system incorporating aspects of the present invention.

FIG. 3 shows a simplified functional block diagram of an exemplary EDA system 300 incorporating aspects of the present invention. The EDA system includes a number of software tools, any of which may access a shaped-based database model 301 containing an integrated circuit design, or one or more portions of an integrated circuit design. The EDA system provides such tools as a graphical user interface 302, global router 304, manual editor 306, detail router 308, engineering change option (ECO) engine 310, timing-driven routing engine 312, extraction engine 314, data export interface 318, and DSM process engine 320. An EDA system may include any number of the system tools shown in FIG. 3, and in any combination. Further, the EDA system may include additional tools not shown in FIG. 3.

An EDA system may be a grid-based system or shape-based system. A grid-based system relies heavily on the concept of a grid and routing grids. Gridded modeling, however, becomes difficult to implement successfully as the routing and feature sizes become smaller. The amount of data increases according to a square law, which means that tasks become increasingly more computationally complex and time-consuming as the amount of data increase. As feature sizes in integrated circuits continue to shrink, more features or geometries may be fitted into the same unit area of an integrated circuit. Therefore, it is important for an EDA system to handle increasingly complex integrated circuits and provide output or results quickly.

The techniques of the invention are especially suited for a shaped-based system, which may also be referred to as a gridless system. A shape-based system has no defined cell size. Each cell, or expansion area, is as large as possible. In brief, a shape-based system can expand edges, which means that an edge of an enclosing rectangle (or other polygon) may be expanded in the direction of the edge as far as desired until the edge finds an obstacle. This may be referred to as a "flood" operation.

The shape may be representative of any polygon. For example, the shape may be a rectangle. The shape may be representative of any polygon of the integrated circuit, such as a net, contact, via, transistor gate, or transistor active area. Blocked edges are edges that cannot be extended because they are blocked by a perimeter of another rectangle, such as another segment, net, or obstacle. Once an obstacle is encountered, then a shape-based approach floods around the obstacle—making a ninety degree or other angle (any angle may be used such as 30 degrees, 35 degrees, 36 degrees, 42 degrees, 45 degrees, or 60 degrees) turns as needed to route around the obstacle.

Chip design, be it analog, custom or digital, will increasingly suffer from timing and signal integrity issues, and in particular crosstalk, as geometries continue to decrease and ever more fine wires are introduced. Gridded solutions are not flexible enough to resolve these issues, let alone achieve a high rate of routing completion. A high performance timing and crosstalk-driven routing solution will become a mandatory requirement in physical design.

The grid-based approach offers fast routing but requires customization to handle off-grid connections and is inefficient for post-route timing and signal integrity optimizations. When net widths and spacings must be changed to reduce resistance or cross-talk, grid-based approaches waste space by moving nets to the next available grid and waste time by resorting to rip-up and re-route techniques. Gridded systems are not good at irregular intervals, irregular spacings, or routing things that do not fit onto a regular grid.

The gridless approach easily handles off-grid connections and is efficient for post-route optimizations. In a shape-based or gridless system, the layout may be a gridless layout, which means there is no grid which structures or polygon of the layout are associated with, other than a grid for the relevant manufacturing process, if any.

In an embodiment, the structure of database 301 facilitates shape-based operations. For example, a structure of this database may include an obstacle tree having nodes and leaves containing the obstacles of an integrated circuit. This tree structure permits rapid determination of where obstacles are when doing operations on the database, such as routing nets.

In FIG. 3, the EDA system 300 includes one or more of the components discussed below, in any combination. One skilled in the art will recognize that one or more of components shown in FIG. 3 may not be required to practice specific aspects of present invention. For example, when DSM process engine 320 is omitted from system, the system could still perform automatic routing of interconnect, but without providing DRC checking capabilities.

A graphical user interface 302 provides users a graphical interface in which to perform operations on the integrated circuit design. For example, the user can view the integrated circuit using the graphical interface. The user may use the mouse and cursor to select a particular polygon or feature, such as a net. The user may expand or zoom into areas of the integrated circuit design.

A global router 304 is an automatic routing engine that coarsely routes interconnects of the integrated circuit, thus enabling large designs to be routed more rapidly and completely. The global router may also provide visual and quantitative analysis of the congestion in the design by highlighting problem areas that can be fixed by incremental adjustments to the floor plan. The global router is sometimes referred to as a coarse router because it provides generally the routes for the interconnect, and may work in conjunction with a detail router 308 (discussed below) to place the geometries of the interconnect.

A manual editor 306 is a shape-editing suite for creating or editing metal, keep-outs, routing areas, and the ability to partition a design into smaller areas. These areas can then be worked upon individually and can be recombined at a later stage to complete the design. Full on-line design rule checking (DRC) ensures that manual operations are completed error-free first time. Powerful tools automatically push-aside existing wiring to make way for new wires and semiautomatic routing tools quickly close down troublesome nets by allowing the user to guide the routing engine around complex areas of the design.

The detail router 308 is an automatic router that completes the wiring in a design by determining the specific routes for each interconnect. The detail router may complete a portion of the wiring for design, such as for sections or specified cells of the design, or may complete all the wiring of the design. The detail router may route starting from scratch or from partially completed routing. In an implementation, the global router determines the general route paths for the interconnect, and the detail router takes this routing information from the global router and puts in the physical detailed geometries of the tracks and vias.

An engineering change order (ECO) engine 310 provides a capability to handle late stage ECO changes. Every element of the design can be modeled incrementally, thus eliminating the need to ever restart the physical design, no matter what changes may need to be made from upstream or downstream processes in the design. ECO engine capabilities can include the ability to shove or push cells aside to make space for new or relocated instances, and the ability to drop groups of components and automatically find legal placement sites for them minimizing the disruption to the design. When pushing or pulling cells, the wires remain connected to the cells and the wires lengthen, shorten, and move as needed, if possible, to keep the connections. The detail router can then repair any violating interconnects and stitch-up any newly introduced interconnects, with minimum impact, ensuring circuit stability is never compromised.

A timing-driven routing engine 312 provides RC timing analysis of interconnects. Used in concert with the detail router, the timing engine can determine the path of least delay for critical nets. Furthermore, the timing engine, in concert with an extraction engine, can actively select a longer path with a lower associated delay (e.g., due to lower capacitance) in preference to a shorter but slower route.

An extraction engine 314 is provided. Utilizing a unified, high-speed RC extraction engine, the crosstalk functionality accurately calculates the coupling between victim and aggressor signals. This same technology is then used to identify potential problems, and automatically implements a DRC correct solution without changing the path of the signal unnecessarily. In addition, signal-to-signal (or within and between classes of signals) spacing rules can be applied, and fully controllable automatic shielding can be used to protect particularly sensitive signals. The user is provided with unprecedented control over the resistance and capacitance in the signal path. Again, using the advanced built-in RC extraction technology, the user can separately control path resistance and capacitance, which is particularly useful for analog and mixed signal design.

In an implementation, the global router and detail router are linked to the extraction engine. So, for example, when running, the global router or detail router, or both, can call the extraction engine to obtain RC extraction information. The global router, detail router, or both, may use the RC extraction information when creating the interconnect routes. For example, the detail router may obtain RC extraction info from the RC engine in order determine whether an interconnect route meets current density rules, and widen the interconnect width as needed. More details are discuss in U.S. patent application Ser. Nos. 10/709,843 and 10/709,844, both filed Jun. 1, 2004 and incorporated by reference.

In a specific embodiment, an RC extraction driven constraints manager has been enhanced to ensure matching on a per-layer basis as well as the whole net or subnet. There is an increasing requirement in today's designs to match length, time, resistance and capacitance across nets on a per-layer basis. This ensures total net constraints are met as before but also guarantees designated nets can match on a per-layer basis.

The tightly coupled, high-speed RC extraction engine is used both during routing (global router or detail router, or both) and for post-routing extraction to reach timing closure in record time. Integrated timing analysis and curative features enable the management of delay within the design; the matching of delays within and between multiple nets; the sharing of delay between many nets in a signal path; and reducing the delay in critical nets by minimizing resistance and capacitance. Intelligent lengthening increases the delay of the faster nets, preventing shoot-through.

The detail router can address current density issues in analog design, to help achieve an optimum routing result for the entire design, and save valuable design time. The current information which is used to drive this current density functionality may come from, for example, a front-end schematic engine or simulation engine. The router can automatically route a net at varying widths to guarantee sufficient track widths at every point in the topology of the net to carry all current requirements. DRC and process checking tools locate any insufficient width areas that may exist in any routing, including automatically generated routing, manual routing, and imported prerouting.

A data export interface 316 is provided so data of the EDA system 300 may be exported for other processes. For example, output from the EDA system may be passed through the export interface to other EDA systems or software tools provided by other manufacturers. The export interface would provide output in a form, format, or structure, acceptable by process or software tool to which it is being exported.

A data import interface 318 provides the means to import data, such as a circuit layout, netlist, or design constraints. The data to be import may be in various formats including data saved from other EDA systems or software tools. In addition, the source of the data may be a database, floppy drive, tape, hard disk drive, CD-ROM, CD-R, CD-RW, DVD, or a device over a communication network. Some examples of import formats include text, ASCII, GDSII, Verilog, SIF, and LEF/DEF.

A DSM process engine 320 is provided. The DSM process engine does design rule checking (DRC). Design rule checking locates and highlights where a design is breaking process design rules. For example, a design rule is the minimum spacing between metal lines (i.e., geometries on a specific layer). A design rule may be the minimum width of a metal line. A design rule may be a minimum polysilicon-to-diffusion spacing. There are many other design rules for a typical process. Some design rules are for checking geometries within a single layer, and some design rules are for checking geometries of two or more layers.

A user may design an integrated circuit using a system such as shown in FIG. 3. A representative flow for designing an integrated circuit is outlined in steps 1 to 8 below. Step 5 is further subdivided into three substeps.

Integrated Circuit Design Flow
 1. Provide Circuit Specification
 2. Create Circuit Design
 3. Generate Netlist
 4. Simulate Performance and Verify Functionality of Circuit Design
 5. Generate Layout
 5a. Layout Devices
 5b. Connect Devices
 5c. Connect Blocks of Circuitry
 6. Physical Verification and Design Checking
 7. Create Masks
 8. Fabricate Integrated Circuit Although the steps above are listed in a specific order, the steps may take place in any order, as desired and depending on the specific application. These are general steps that may be applied to designing an integrated circuit including custom, a gate array, standard cell, field programmable logic, microprocessor, digital signal processor, microcontroller, system-on-a-chip (SOC), memory, ASIC, mixed signal, analog, radio frequency (RF) or wireless, and others. There may be additional or other steps, which may replace one or more above steps. Certain steps may be repeated. For example, after generating a layout for a circuit design, the step of simulating performance and verifying functionality may be performed again. This time, the parasitics and RC considerations from the layout can be back-annotated into the netlist or circuit design, and the design simulated again. The results of this simulation will presumably be more accurate because more precise information is provided.

In step 1 of the flow, a circuit specification is provided. This is a specification or description of what the integrated circuit or circuit will do, and what the performance will be. For example, the integrated circuit may be a memory integrated circuit with particular address input pins and input-output (I/O) pins. Integrated circuit performance may be quantified terms in AC and DC performance. For example, AC performance refers to propagation delays, maximum clock frequency, clock-to-output delay, hold time, and other similar parameters. DC performance refers to maximum supply current, maximum and minimum supply voltage, output current drive, and other similar parameters.

In step 2, an engineer creates a circuit design that presumably will meet the circuit specification. This circuit design may include transistors, resistors, capacitors, and other electronic components. The engineer uses these electronic components as building blocks of the design, interconnecting them to achieve the desired functionality and performance. The engineer may make a custom design using electronic component building blocks or use a gate array, where the building blocks are sets of cells set by the gate array manufacturer. The design may be input using a graphical design tool such as schematic capture program, and any other design tool may be used. The circuit may be described using a high-level design language (HDL). These design tools will create a netlist (step 3) of the circuitry, which is a listing of the components of the devices and their interconnections.

During the design phase, the engineer simulates the performance and verifies the functionality of the circuitry (step 4). There are transistor and process models to model the components. Some simulation tools include Spice, which performs circuit simulation, and Verilog, which performs functional and timing verification. This is where the electrical information for current density routing is generated.

After deciding upon an initial circuit design, the engineer begins layout (step 5) of the circuitry. Layout refers to making the three-dimensional dispositions of the element and interconnections to make an integrated circuit. Making an integrated circuit is a layer by layer process. Some layers of an integrated circuit are diffusion, polysilicon, metal-1, metal-2, contact, via, and others. There may be multiple layers of the same material, but on different layers. For example, diffusion and polysilicon layers are used to make MOS transistors (step 5a). For example, metal-1 and metal-2 are two different layers, where metal-1 is below the metal-2 layers. These metal layers may be connected together using a via. Metal is typically used for interconnections (step 5b) and supplying power and ground to the devices.

Software tools may be used to help with the layout of the circuit, such as the automatic routing of interconnect (steps 5b and 5c). The interconnect may be between devices. Devices and circuitry may be grouped into blocks or cells having inputs and outputs. The interconnect may be between these blocks or cells (step 5b).

In step 6, after or while the layout is generated, the physical design is verified and checked. For example, some of these operations may include layout-versus-schematic (LVS) checking, electrical rule checking (ERC), design rule checking (DRC), layout simulation (especially for analog circuitry), power analysis, and timing analysis. Physical verification and design checking is often iterative. Based on the design check, a design engineer or user may make changes to the design or layout, or both and the design may be rechecked in order to make sure any areas of concern or design errors have been cleared.

The result of layout is data (e.g., provided in GDSII or other format) that is used to make the masks (step 7). The masks are used to fabricate the integrated circuit (step 8) using a photolithography process. Typically, there are many "copies" of the same integrated circuited fabricated on the same wafer. Each integrated circuit is a "die" on the wafer. Good dies are separated from the bad dies. The good dies are sawed and packaged. Packaging generally includes encapsulating the die in plastic or other material, and connecting pads of the integrated circuit to pins of the package, where the integrated circuit can be interfaced.

The invention provides a technique for filling vacant areas of integrated circuit design. Vacant areas of a layer are those areas of the area where no drawn polygon is resides. These vacant areas are filled with metal or another conductor connected to a supply line such as power or ground. Compared to layout engineers manually drawing shapes in an unused area, while trying to conform to DRC rules (which is very tedious and time consuming), the technique of the invention is a computer-implemented or automated technique.

For some particular integrated circuit designs, it is desirable (or required) to fill vacant areas of a routed design with metal or other conductive material. This approach is typically performed on metals layers of the integrated circuit design, but can be applied to other layers as desired. This application describes the approach with respect to metal layers, but one of ordinary skill in the art would recognize the technique is applicable to other types of layers.

In an implementation, this metal is connected to a supply line or net, such as power and ground. In other implementations, the metal can be left floating or connected to a line such as a signal line or a high or negative voltage line (e.g., output of a charge pump).

This application provides a specific example of technique of the invention. Some sample rules include: Each layer may have any number of voltages that the filled nets can be connected to. For example, the voltage nets on a particular layer may be VCC and ground or GND. There may be multiple VCCs, such as VCC1, VCC2, VCC3, and so forth. There may be multiple grounds, such as GND1, GND2, GND3, and so forth. There may be other voltage nets such as VPP, VBB, or others.

Each layer to be filled will have a list of nets to be used with approximate relative percentages. The user can specify each of the target percentages. For example, a metal-2 layer has a power filling criteria of: 40 percent for VCC1, 40 percent for VCC2, and 20 percent for GND. The total of percentages should equal 100 percent. If the total is less than or greater than 100, the computer may display a message give the user a warning. The values for each power net can have any value such as 5, 10, 15, 25, 28, 30, 35, 40, 45, 50, 60, and others.

Additionally, there can be system defaults for each of the power net voltage layers. For example, the system default may be to allocate the free space evenly among the power nets. If there are five power nets, then each net will be allocated 20 percent (i.e., 100 divided by the number of power nets—5). Typically there will be at least two power nets, VCC and GND.

In a specific implementation, the percentage specified for each power net is the percentage for the added nets to fill the free space. If rule for layer L specifies ratios for nets (e.g., N1, N2, and N3), the actual percentage for N1 is the area of N1 on that layer as a percentage of the total area of (N1+N2+N3) on that layer. This includes pin, metal, and fillers, but excludes routing (e.g., track and vias).

In another implementation, the percentage specified may be with respect to the total power net geometries on the layer, not just the nets that have been added in the free space. For example, if 40 percent is specified for VCC1, then the technique will attempt to target the total VCC1 geometries to be 40 percent of all power nets of the layer. In this implementation, the target percentages specified for the nets added in the free space may not need to equal 100.

Shapes created to fill vacant areas should have widths within specified minimum and maximum constraints. In order to satisfy a max_width constraint, a large vacant area will be filled with stripes of metal where the stripes are consistent with the general direction of metal on that layer.

There can be constraints based on orientation (e.g., north, south, east, west, vertical, or horizontal), such as a max_width which is different from a max_height. Then, vertical stripes can have a maximum width that is independent of and different from the horizontal stripes. For example, the horizontal width maximum is 2 microns, while the vertical width maximum is 1.8 microns. Different width constraints widths for different orientations may be used to compensate for optical effects such as lens astigmatism during fabrication of an integrated circuit.

In an implementation, the power fill technique has three subroutines (each of which can be implemented as a tool):
 1. Shape Creation
 2. Delete Hanging
 3. Prune
 Shape Creation Method The shape creation method creates shapes of geometries in the free space of the layer. These shapes are assigned a property to indicate that they were automatically generated in the free space. That way a user will be able to distinguish and view which shapes were automatically generated.

The following describes how an individual layer is populated with metal shapes on the appropriate nets. This method is documented assuming that the layer is y-biased. For an x-biased layer, "bottom" would read "left," and "top" would read "right" and so forth.

Two subtly different types of metal filler are considered: Firstly, metal that abuts existing pin/metal on that layer. Secondly, metal that is completely in free-space on that layer.

The free-space technique includes the following steps:
 1. Start with a list of rectangles comprising a single rectangle covering the complete area for which filling is required. This list is used to represent the vacant space on that layer. One approach starts from a lowermost layer and propagates upward. So, if there are three different layers of metal. The metal-1 layer would be the first to be processed.

Then metal-2 and metal-3 would sequentially follow. In other approaches, the uppermost layer may be processed first.

2. For each existing shape on this layer:

2a. Grow it by the maximum spacing between it and power metal

2b. Subtract the grown shape from the rectangle list

2c. Discard any rectangles that are smaller than a min width in either x or y.

Figure 4A:
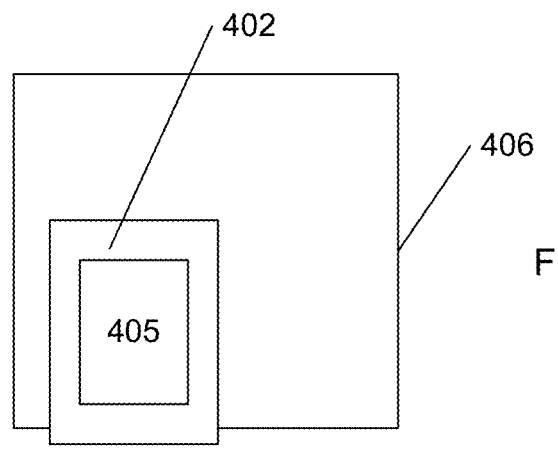
FIGS. 4A-4C show a step in a technique of shape creation.
Figure 4B:
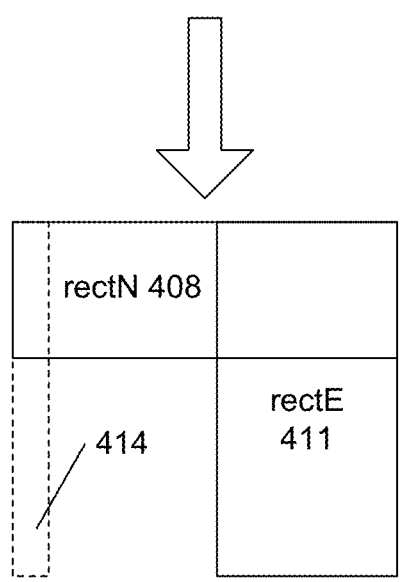
Figure 4C:
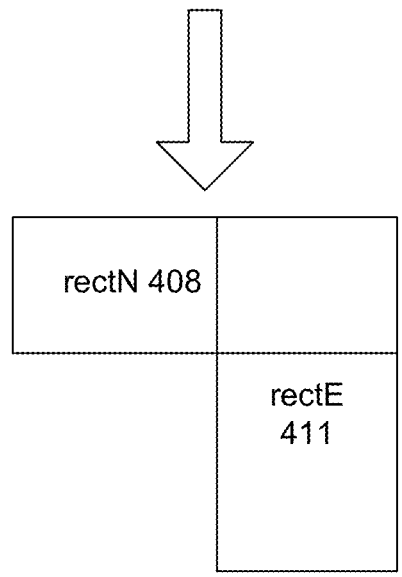

FIGS. 4A-4C show the effect of subtracting a grown rectangle 402 based on a metal object 405 from a rectangle. In FIG. 4A, first a selection rectangle 406 is drawn to cover and select the complete area where filling is desired. The selection rectangle is on or overlaps (at least partially overlaps) an existing shape or geometry 405. The technique oversizes shape 405 to obtain rectangle 402. The amount of the oversize depends on the design rules for metal-to-metal spacing specified for that layer. For example, if the metal-to-metal spacing specify 0.5 microns, then rectangle 405 will be oversized by 0.5 microns on each size to obtain rectangle 402.

Grown rectangle 402 is subtracted from rectangle 406. As shown in FIG. 4C, the resulting effect is that this rectangle gets replaced by two smaller overlapping rectangles, rectN 408 on a north side and rectE 411 on an east side. South and west residual rectangle are discarded on the basis of being too small. As shown in FIG. 4B, the west residual rectangle 414 is shown in broken lines and is discarded because its width is less than a minimum metal width permitted. For example, the minimum metal width permitted by the design rules may be 0.3 microns.

A result of step 2 (steps 2a to 2c) is a list of rectangles representing the fillable space on that layer. This is the free space on the layer that can be filled with additional shapes.

3. Assuming that we are working on a y-biased layer, in implementation, find the extreme west free-space rectangle (or extreme south for an x-biased layer). For example, in FIG. 5A, rectangle 509 qualifies as the extreme west free-space rectangle. This is because the left edge of rectangle (indicated by reference number 509) is further left than any of the other rectangles in FIG. 5A. Reference number 509 refers to a lower, leftmost point of rectangle 503.

The technique may use any rectangle as a starting point for the process. For example, the technique may start with the uppermost, rightmost, or bottommost rectangles.

A limit 515 will be calculated as:

Limit=extreme west coordinate+max_width.

The limit line 515 is a vertical line positioned at a max_width distance from point 509. So, if max_width is 2 microns, limit 515 will be 2 microns from point 509.

Figures 5A, 5B:
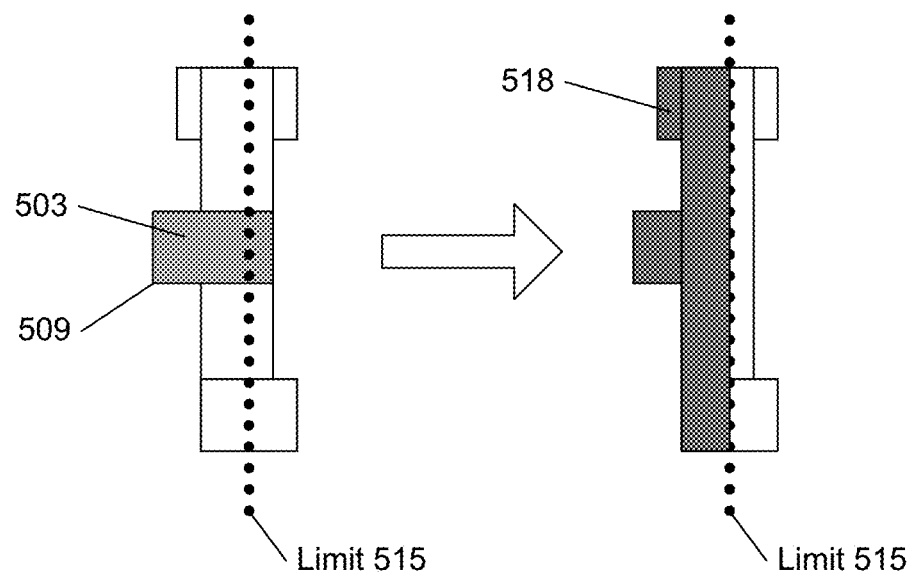
FIGS. 5A-5E show another step in shape creation.

4. Grow an island starting from this rectangle, by recursively looking for other free-space rectangle which when truncated to "limit," overlaps the island rectangle by min width in both dimensions (vertically and horizontally). FIG. 5B shows an example of a grown island 518 for FIG. 5A.

Figures 5C, 5D:
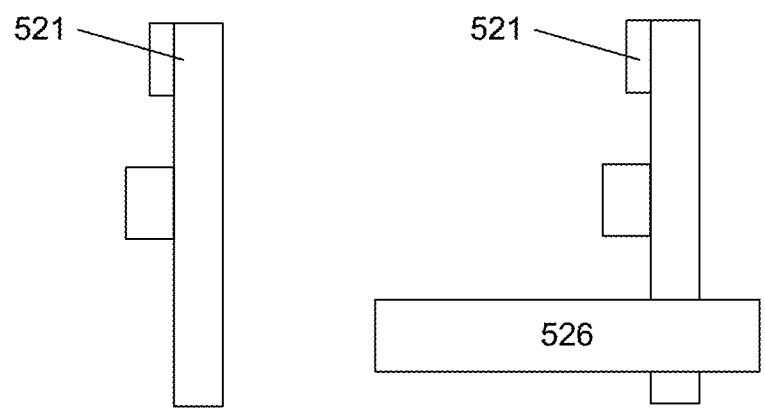

5. Take the outline of the rectangles that constitute the island, and trim it according to the minimum step rule: any steps on this outline that are too small, result in the shape being shrunk. The portions of the rectangles greater than permitted by the limit line are removed. A resulting shape 521 from FIG. 5B is shown in FIG. 5C.

6. Determine which of the relevant power nets are overlapped by this shape. This is done by looking for pin or metal on other layers. In FIG. 5D, there is a shape 526 for a power net on a different layer than shape 521 that overlaps shape 521. It will be possible to connect power from shape 526 to shape 521 using a via connection.

As discussed above, an approach starts from the lowermost layer and propagates upward. In an implementation, the technique considers power nets added to the vacant areas by this technique during a previous iteration for a lower layer. Specifically, for example, shape 526 may have been added to the free space in a previous layer by a technique of this invention.

7. Order these candidate nets by decreasing deficit (i.e., required fill quota minus actual fill quote). The net associated with the last piece of fill metal created is relegated behind any deficient nets, in order to try to avoid adjacent fillers being associated with the same net.

Figure 5E:
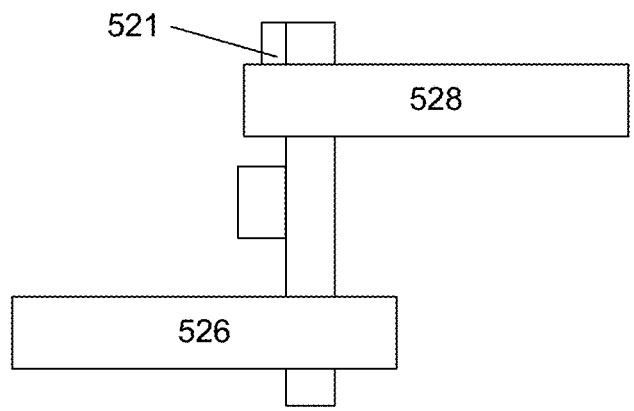

FIG. 5E shows an example of this step. There are multiple shapes 526 and 528 for power nets on a different layers than shape 521 that overlaps shape 521. Shape 526 is connected to VCC1, while shape 528 is connected to VCC2. If at that point, VCC1 is at 38 percent (where 40 percent is the target) and VCC2 is at 32 percent (where 40 percent is also the target), the technique will preferentially connect shape 521 to 528 instead of 526 because VCC2 is lower (by percentage or absolute value) than the target more than VCC1 is.

N1, N2, and N3 are the three different power nets which are used to fill the vacant areas according to the specified percentages. In a technique, if N1 is very low, and N2 is slightly low, and N3 is high, and the proposed filler overlaps all three nets, then N1 will be given highest priority because it is most deficient. However if the previous filler assigned was an N1, then N2 is favored, as it is also deficient. This approach is used to try to reduce the occurrence of adjacent fillers on the same net.

As one of ordinary skill in the art will appreciate, the percentage rules are approximate, because by the time hanging filler are removed and prune, the actual percentages could change. Therefore, specified percentages are used as guidelines.

8. Create metal using the outline determined above and the first candidate net. If this metal is legal, try to strap it to the overlapping metal on this net by inserting vias. For FIG. 5D, a via (layer not shown in the figure) is added between shapes 521 and 526. In FIG. 5E, the technique adds via (layer not shown in the figure) to connect shapes 528 and 521.

If strapped successfully, then the metal filler is accepted and the list of remaining holes is updated by applying step 2 to this shape.

If the metal was illegal, or strapping failed, then try next candidate net, and so forth. If shape 521 cannot be connected to a power net on another layer or to another power net on the same layer (see abutting algorithm below), shape 521 will be discarded (e.g., removed) if for the technique it is not desirable to have floating metal.

9. While there are holes remaining, repeat from step 3.

An abutting algorithm includes the following steps (which are similar to those described above). This abutting technique attempts to strap or connect a shape added to the free space to another power net on the same layer. This other power net may be one that the user drew into the layer or one that may be entered previously by the technique of the invention. This abutting technique may be performed before (or after) attempting to strap or connect a shape to a power net on a different layer.

These steps are applied to each pin or metal item on relevant power nets, within the area being filled, and on the layer being processed.

1. Start with a list of rectangles comprising a single rectangle extended from the bottom edge of item to bottom edge of area being filled.

2. Subtract oversized used space from this rectangle list. See FIG. 4.

The oversizing is applied using the required spacing between the object and power metal. Any residual free-space rectangles that are smaller than min width in either dimension are discarded.

The result of this step is a list of rectangles representing the fillable space beyond the pin/metal.

3. Calculate Limit=west coordinate of edge+max_width

4. Grow island as in step 4 of the free-space technique above

5. Trim it as in step 5 of the free-space technique above

6. Create metal shape using trimmed outline as per step 8 of the free-space technique above, except that in this case the net is known.

Repeat steps 2-6 using the top edge of the pin or metal item.

Delete Hanging Method

In a specific implementation, there is a condition to be able to identify and delete redundant power fillers. Essentially a power filler is redundant unless it connects directly or indirectly to at least two islands containing a real pin or metal. A technique of the invention determines whether a metal filler is redundant or hanging. If redundant or hanging, the metal filler is removed.

In FIGS. 6A-6C and 7, nets running in the horizontal direction are metal-1, while nets running in the vertical direction are metal-2. Metal with solid fill is a real pin or metal, while metal in shaded fill is a metal filler. Vias for strapping the intersections of metal-1 and metal-2 are not shown.

Specifically, geometries or shapes 603, 604, 605, and 607 are metal-1 and real pin or real metal. These geometries were drawn or added to the layer by the user and not automatically generated by a technique of the invention. Lines 613, 615, and 617 are also metal-1, but are metal filler. Lines 623, 625, and 627 are metal-2 and metal filler. Line 629 is metal-2 and a real pin or real metal. Metal filler are shaped added by a power fill technique (to fill vacant areas or free space) of the invention.

FIG. 6A shows a layout where all fillers (numbered 613 and 623) are redundant. There are vias between shapes 623 and shape 603, and shapes 623 and shape 613. However, there is no flow path through the filler, which makes the filler redundant.

FIG. 6B shows a layout with no redundant fillers (numbered 613 and 623). Compared to the situation in FIG. 6A, there is a shape 629 which is connected through a via to shape 613. Current on shape 604 will be able to flow through the filler to shape 629. Therefore, none of the filler are redundant in this case.

FIG. 6C shows a layout where four fillers (numbered 615 and 623) on the left are redundant, while the other fillers (three fillers on the right, numbered 617, 625, and 627) are not. Current from shape 605 will be able to flow through fillers 625, 627, and 617 to shape 609 and 607; these fillers are not redundant. However, fillers 623 in FIG. 6C are redundant as explained for FIG. 6A.

A technique to determine whether or not a particular filler is redundant is as follows:

1. If the filler has less than two physical contacts, it is hanging.

2. Define an island to be a group of physically connected items on a layer. Hence, for example, FIG. 6C has four islands on metal-1 and five islands on metal-2.

3. Define a rocky island to be an island that contains at least one pin or real metal.

4. Traverse the tree structure as shown in the above diagrams, starting from the filler. Do not walk beyond pin or real metal items. If more than one rocky island is encountered from different points on the original filler, the filler is not redundant. If, for example a filler has a via contact which in turn contacts two pins on different layers, then that is only regarded as a single rocky island contact as both island are reached through the same contact point of the filler.

Prune Method

Having created metal fillers and removed redundant fillers, we are left with useful fillers which may well extend beyond their via contacts or contain bulges that serve no purpose.

Figures 7A, 7B:
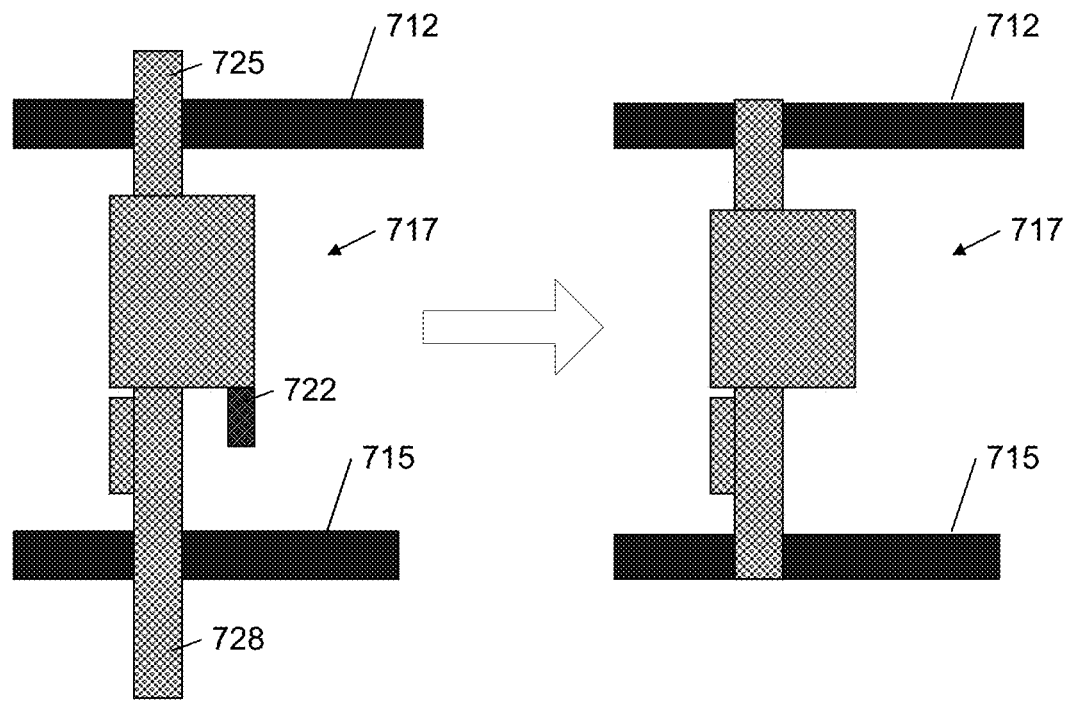
FIGS. 7A and 7B shows results of a prune technique.

FIGS. 7A and 7B shows an example of the prune technique. Geometries or lines 712 and 715 are metal-2, while the other geometries 717 are metal-1 fillers.

The method for achieving this pruning effect is as follows:

--- for each line of the outline shape
    if it faces the layer bias (i.e., horizontal in this case)
        it is a bracket (i.e., the previous and next lines are in
        the same vertical direction)
            prune this bracket (limiting the prune to extreme contact if any)
            restart from the beginning of the shape outline

---

This technique results in the pruning of the three brackets as shown in the changes from FIG. 7A to 7B. For example, region 722 in FIG. 7A has a very narrow width and is removed, so it is not in the shape of FIG. 7B. Also, the regions of the filler above shape 712 (indicated by reference number 725) and below shape 715 (indicated by reference number 728) are also removed. There are vias or contacts connecting the metal filler to shapes 712 and 715. Regions 725 and 728 extend beyond a desired distance from the via.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A method comprising:
   using a computer, automatically creating a first shape comprising rectangles that is representative of free space on a first layer of an integrated circuit design;
   automatically creating a second shape comprising rectangles that is representative of free space on a second layer of the integrated circuit design, wherein the second layer is different from the first layer;
   automatically creating a first via shape in a third layer, different from the first and second layers, that overlaps both the first and second shapes;
   determining whether the first shape is further coupled to a third shape on a fourth layer, different from the first and second layers, wherein the third shape is representative of a power voltage net; and if the first shape has a further coupling to the third shape, not discarding the first shape and the first via shape.

2. The method of claim 1 comprising:
if the first shape does not have a further coupling to a third shape, discarding the first shape and the first via shape.

3. The method of claim 1 wherein a distance from a leftmost edge of the first shape to a rightmost edge of the first shape does not exceed a maximum width specified for the automatic creation.

4. The method of claim 1 comprising:
upon request by a user, showing only the automatically generated shapes of the first layer on a display of the computer.

5. The method of claim 1 comprising:
determining whether the first shape is further coupled to a fourth shape on a fourth layer, different from the first and second layers, wherein the fourth shape is representative of a ground voltage net; and
if the first shape has a further coupling to a fourth shape, not discarding the first shape and the first via shape.

6. The method of claim 5 comprising:
if the first shape does not have a further coupling to a fourth shape, discarding the first shape and the first via shape.

7. The method of claim 1 comprising:
if the first shape does not have a further coupling to a third shape, discarding the first shape and the first via shape;
determining whether the first shape is further coupled to a fourth shape on a fourth layer, different from the first and second layers, wherein the fourth shape is representative of a ground voltage net;
if the first shape has a further coupling to a fourth shape, not discarding the first shape and the first via shape; and
if the first shape does not have a further coupling to a fourth shape, discarding the first shape and the first via shape.

8. The method of claim 1 wherein the automatically creating a first shape comprising rectangles that is representative of free space on a first layer of an integrated circuit design comprises:
determining where the first rectangle overlaps a previously drawn second rectangle on the first layer;
using at least one computer processor, oversizing the second rectangle to obtain a third rectangle;
using at least one computer processor, subtracting the third rectangle from the first rectangle to form a fourth rectangle, fifth rectangle, and sixth rectangle, wherein the fourth, fifth, and sixth rectangles each have a smaller area than the first rectangle and the fourth, fifth, and sixth rectangles overlap;
if the sixth rectangle has a smaller width than a first minimum width, discarding the sixth rectangle while keeping the fourth and fifth rectangles;
starting with an edge of the fourth rectangle, growing an island that extends from the edge to a limit line at a second minimum width; and
discarding portions of the fourth and fifth rectangles beyond the limit line to obtain a first shape comprising rectangles.

9. The method of claim 1 comprising:
determining whether the first shape is further coupled to a fourth shape on a fourth layer, different from the first and second layers, wherein the fourth shape is representative of a GND voltage net;
if the first shape has a further coupling to a fourth shape, not discarding the first shape and the first via shape;

providing a first target percentage and a second target percentage, wherein a sum of the first and second target percentages is less than or equal to 100, the first target percentage is representative of a percentage of rectangles in the first layer coupled to the power voltage net, and the second target percentage is representative of a percentage of rectangles in the first layer coupled to the ground voltage net; and
automatically coupling rectangles to the power or ground voltage nets according to the first target percentage and the second target percentage.

10. The method of claim 1 wherein when the first shape is coupled to the third shape, the first shape and the first via shape is not discarded, this results in the first shape being coupled to the second shape through the first via shape in the third layer, and the first shape being coupled to the power voltage net through the second and third shapes, thereby coupling free space on the first layer to the power voltage net.

11. The method of claim 1 comprising:
by way of not discarding the first shape and the first via shape, transforming free space on the first layer into the power voltage net.

12. The method of claim 1 comprising:
after the not discarding the first shape and the first via shape, denoting the first layer as being representative of the power voltage net.

13. The method of claim 1 wherein the creating a first shape comprising rectangles, transforms free space on the first layer into the first shape,
wherein the second shape comprising rectangles, transforms free space on the second layer into the second shape,
wherein the creating a first via shape in a third layer, different from the first and second layers, that overlaps both the first and second shapes, transforming the first layer and the second layer from being two different floating layers so the first layer and second layer are coupled together, and
wherein the determining whether the first shape is further coupled to a third shape on a fourth layer, different from the first and second layers, wherein the third shape is representative of a power voltage net, transforming the second layer from being a floating layer to being coupled to the power voltage net.

14. The method of claim 1 wherein the first layer and third layer will be used to create a mask set for a fabrication of an integrated circuit.

15. The method of claim 1 wherein the automatically creating a first shape comprising rectangles that is representative of free space on a first layer of an integrated circuit design comprises:
determining where the first rectangle overlaps a previously drawn second rectangle on the first layer;
using at least one computer processor, oversizing the second rectangle to obtain a third rectangle;
using at least one computer processor, subtracting the third rectangle from the first rectangle to form a fourth rectangle, fifth rectangle, and sixth rectangle, wherein the fourth, fifth, and sixth rectangles each have a smaller area than the first rectangle and the fourth, fifth, and sixth rectangles overlap;
if the sixth rectangle has a smaller width than a first minimum width, discarding the sixth rectangle while keeping the fourth and fifth rectangles;

starting with an edge of the fourth rectangle, growing an island that extends from the edge to a limit line at a second minimum width;

discarding portions of the fourth and fifth rectangles beyond the limit line to obtain a first shape comprising rectangles;

determining whether the first shape is further coupled to a fourth shape on a fourth layer, different from the first and second layers, wherein the fourth shape is representative of a ground voltage net;

if the first shape has a further coupling to a fourth shape, not discarding the first shape and the first via shape;

providing a first target percentage and a second target percentage, wherein a sum of the first and second target percentages is less than or equal to 100, the first target percentage is representative of a percentage of rectangles in the first layer coupled to the power voltage net, and the second target percentage is representative of a percentage of rectangles in the first layer coupled to the ground voltage net; and automatically coupling rectangles to the power or ground voltage nets according to the first target percentage and the second target percentage.

16. The method of claim 15 wherein a distance from a leftmost edge of the first shape to a rightmost edge of the first shape does not exceed a maximum width specified for the automatic creation.

* * * * *